United States Patent
Singh et al.

(10) Patent No.: US 12,267,870 B2
(45) Date of Patent: Apr. 1, 2025

(54) METHOD AND SYSTEM FOR PERFORMING RANDOM ACCESS CHANNEL PROCEDURE FOR UNLICENSED OPERATION

(71) Applicant: Samsung Electronics Co., Ltd., Suwon-si (KR)

(72) Inventors: Abhishek Kumar Singh, Bangalore (IN); Anil Agiwal, Bangalore (IN); Pravjyot Singh Deogun, Bangalore (IN); Anshuman Nigam, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 740 days.

(21) Appl. No.: 17/267,013

(22) PCT Filed: Aug. 8, 2019

(86) PCT No.: PCT/KR2019/009967
§ 371 (c)(1),
(2) Date: Feb. 8, 2021

(87) PCT Pub. No.: WO2020/032618
PCT Pub. Date: Feb. 13, 2020

(65) Prior Publication Data
US 2021/0307078 A1    Sep. 30, 2021

(30) Foreign Application Priority Data

Aug. 8, 2018 (IN) .............. 201841029871
Aug. 6, 2019 (IN) .............. 201841029871

(51) Int. Cl.
H04W 74/0833    (2024.01)
H04L 5/00    (2006.01)
(Continued)

(52) U.S. Cl.
CPC ....... *H04W 74/0833* (2013.01); *H04L 5/0048* (2013.01); *H04W 16/14* (2013.01); *H04W 24/08* (2013.01); *H04W 74/0808* (2013.01)

(58) Field of Classification Search
CPC . H04W 74/0833; H04W 16/14; H04W 24/08; H04W 74/0808; H04L 5/0048
(Continued)

(56) References Cited

U.S. PATENT DOCUMENTS

2016/0353467 A1    12/2016    Nekovee
2017/0231011 A1    8/2017    Park et al.
(Continued)

FOREIGN PATENT DOCUMENTS

| | | |
|---|---|---|
| EP | 3337231 A1 | 6/2018 |
| KR | 10-2017-0093071 A | 8/2017 |
| WO | 2017136458 A2 | 8/2017 |

OTHER PUBLICATIONS

Office Action dated Feb. 15, 2021 in connection with India Patent Application No. 201841029871, 5 pages.
(Continued)

*Primary Examiner* — Xuan Lu

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

Embodiments herein disclose a method for performing random access channel procedure by a UE (300). The method includes determining a first measurement metric value and a
(Continued)

second measurement metric value for one of a plurality of SSBs and a plurality of CSI-RSs. The method includes selecting one of a first set of SSBs and a first set of CSI-RSs from one of the plurality of SSBs and the plurality of CSI-RSs based on the first measurement metric. The method selects a second set of SSBs and a second set of CSI-RSs from one of the first set of SSBs and the first set of CSI-RSs based on the second measurement metric and determines a selection criteria and selects one of at least one candidate SSBs and at least one candidate CSI-RS from one of the second set of SSBs and the second set of CSI-RSs based on the selection criteria.

15 Claims, 6 Drawing Sheets

(51) Int. Cl.
     *H04W 16/14*         (2009.01)
     *H04W 24/08*         (2009.01)
     *H04W 48/16*         (2009.01)
     *H04W 74/0808*      (2024.01)

(58) Field of Classification Search
     USPC ........................................................ 370/252
     See application file for complete search history.

(56) References Cited

U.S. PATENT DOCUMENTS

| | | |
|---|---|---|
| 2018/0084585 A1 | 3/2018 | Lee et al. |
| 2018/0192384 A1 | 7/2018 | Chou et al. |
| 2018/0205507 A1 | 7/2018 | John Wilson et al. |
| 2018/0241511 A1 | 8/2018 | Harada et al. |
| 2018/0270894 A1* | 9/2018 | Park .................. H04W 36/02 |
| 2019/0053271 A1* | 2/2019 | Islam ................. H04W 52/281 |
| 2019/0182870 A1* | 6/2019 | Shih .................. H04W 16/32 |
| 2020/0015236 A1* | 1/2020 | Kung .................. H04B 7/04 |
| 2020/0037361 A1* | 1/2020 | Chakraborty ..... H04W 74/0833 |
| 2021/0112604 A1* | 4/2021 | Bao .................. H04W 74/0808 |

OTHER PUBLICATIONS

European Patent Office, "Supplementary European Search Report" issued Feb. 21, 2022, in connection with European Patent Application No. 19848297.8, 9 pages.

Samsung: "Clarification on Random Access Resource selection", R2-1809497, 3GPP TSG-RAN WG2 NR AH 1807, Montreal, QC, Canada, Jul. 2-6, 2018, 7 pages.

3GPP IS 38.215 V1.1.2 (Nov. 2017) Technical Specification; 3rd Generation Partnership Project; Technical Specification Group Radio Access Network; NR; Physical layer measurements (Release 15); 12 pages.

Interdigital Inc: "Considerations on Random Access for NR Unlicensed Spectrum", R1-1802648, 3GPP TSG RAN WG1 Meeting 92, Athens, Greece, Feb. 26-Mar. 2, 2018, 4 pages.

Huawei, HiSilicon, "Correction to random access procedures in TS 38.321", 3GPP TSG-RAN WG2 NR Ad hoc 0118, Jan. 22-26, 2018, R2-1800242, 10 pages.

Huawei, HiSilicon, "Remaining issues in RA with multi-beam operations", 3GPP TSG-RAN2 Meeting #AH, Jan. 22-26, 2018, R2-1800993, 2 pages.

"3rd Generation Partnership Project; Technical Specification Group Radio Access Network; NR; Medium Access Control (MAC) protocol specification (Release 15)", 3GPP TS 38.321 V15.2.0 (Jun. 2018), 73 pages.

International Search Report dated Nov. 25, 2019 in connection with International Patent Application No. PCT/KR2019/009967, 3 pages.

Written Opinion of the International Searching Authority dated Nov. 25, 2019 in connection with International Patent Application No. PCT/KR2019/009967, 5 pages.

Notice of Hearing issued Dec. 28, 2023, in connection with Indian Patent Application No. 201841029871, 3 pages.

* cited by examiner

[Fig. 1]
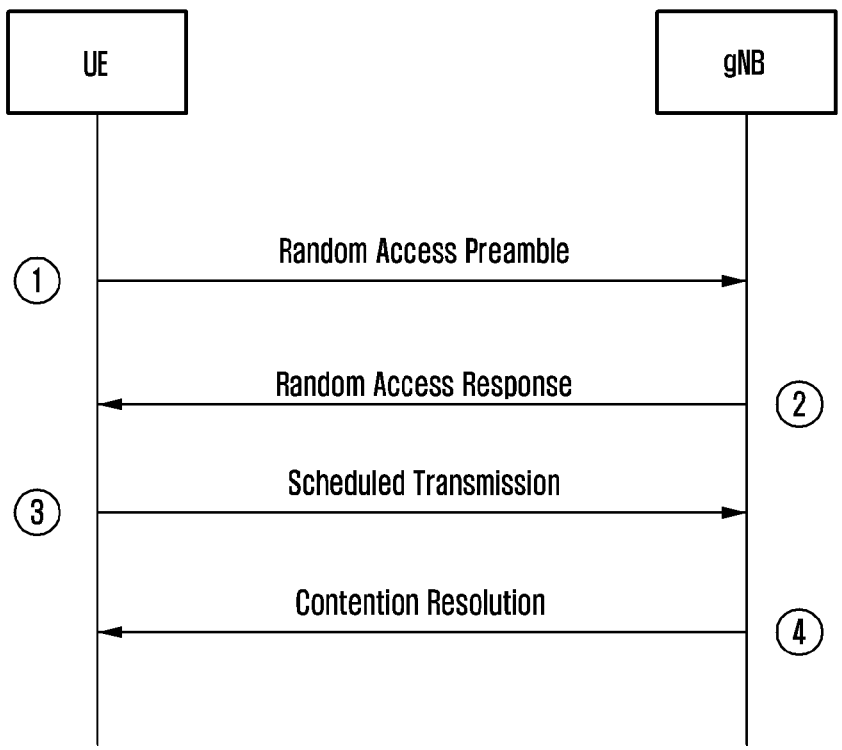
[Fig. 2]
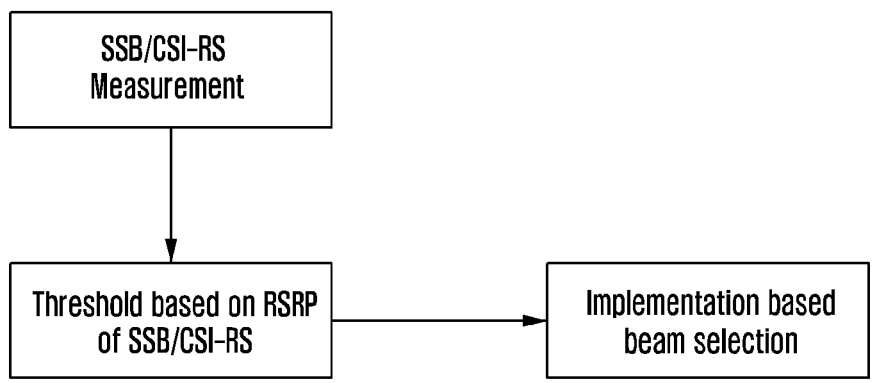
[Fig. 3]
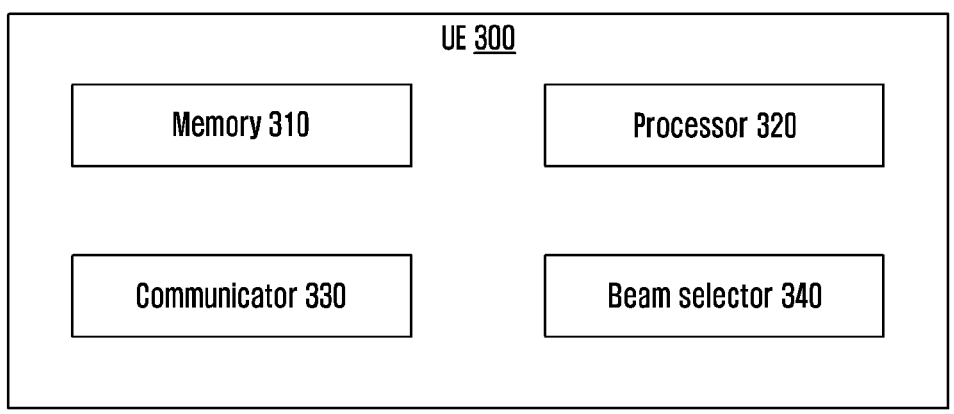

[Fig. 4]
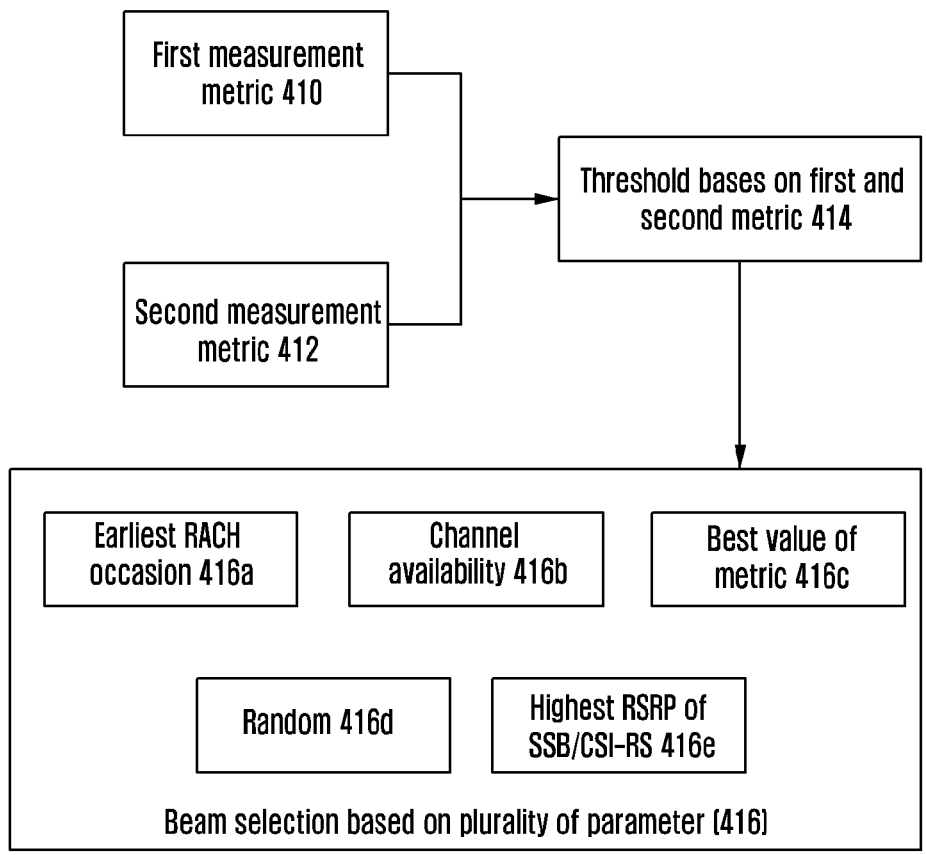

[Fig. 5]
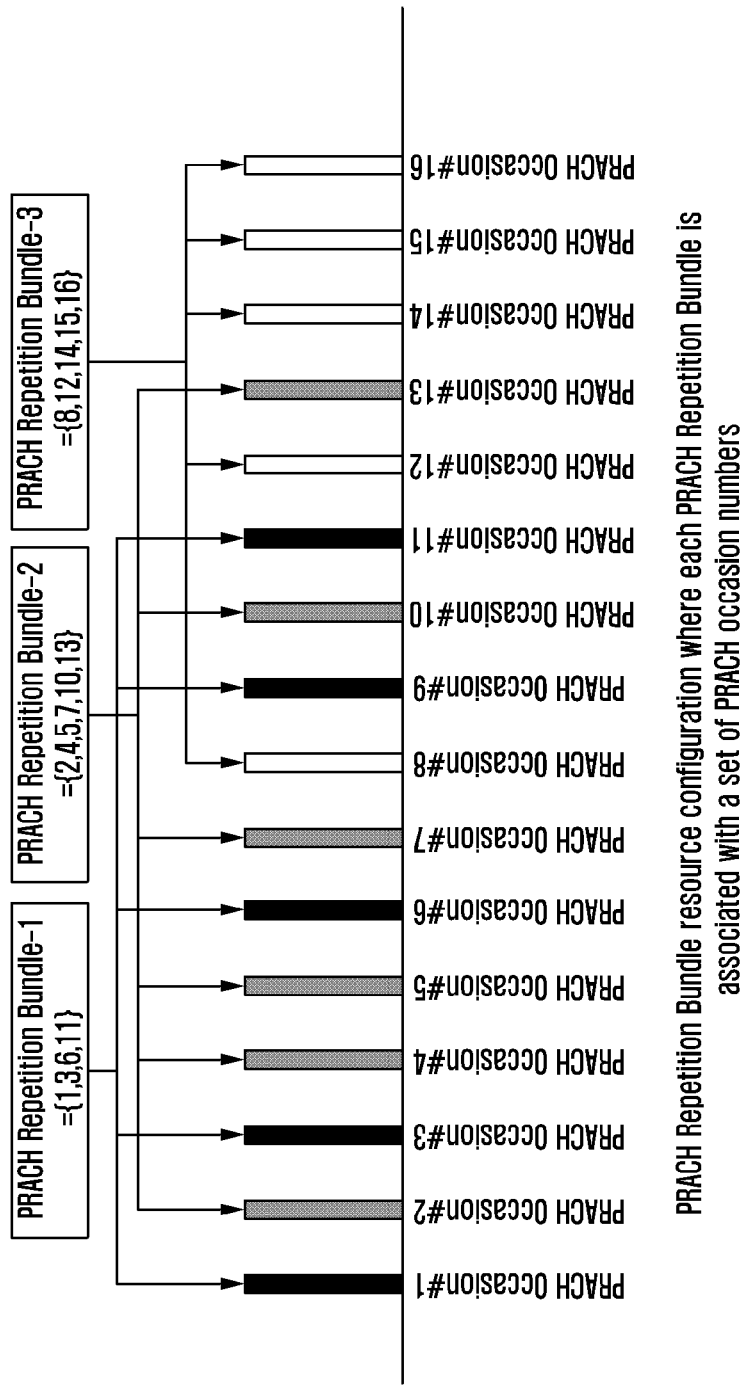

[Fig. 6]
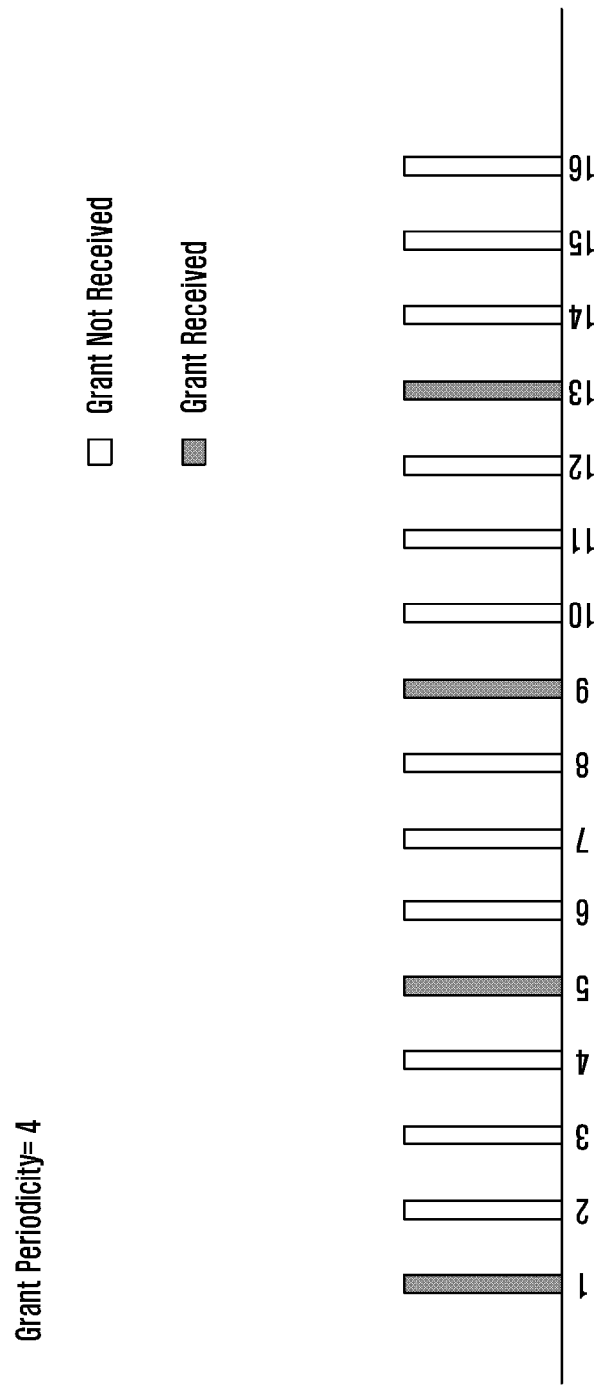

[Fig. 7]
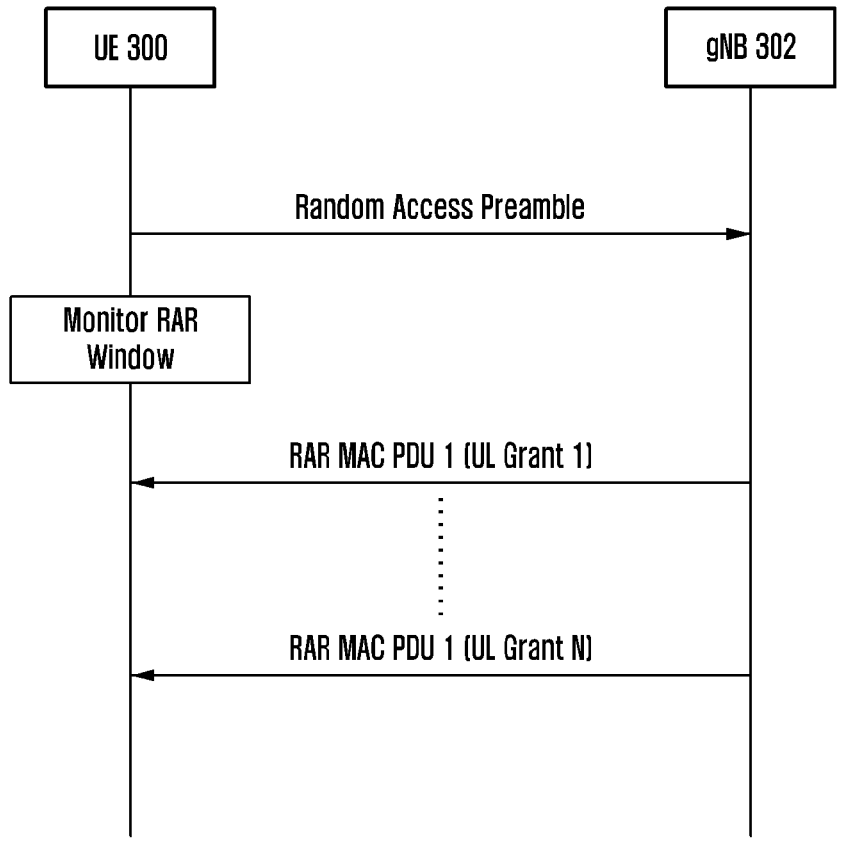
[Fig. 8]
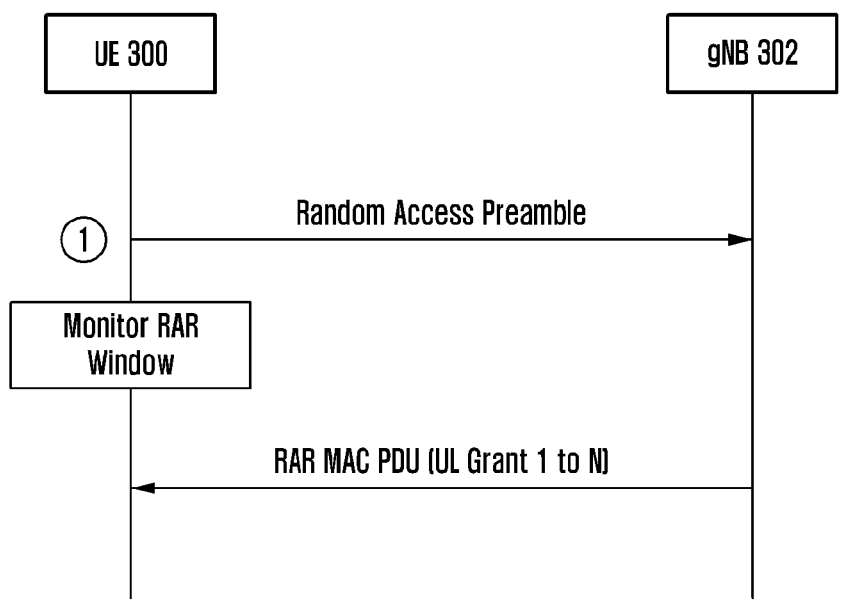

[Fig. 9]
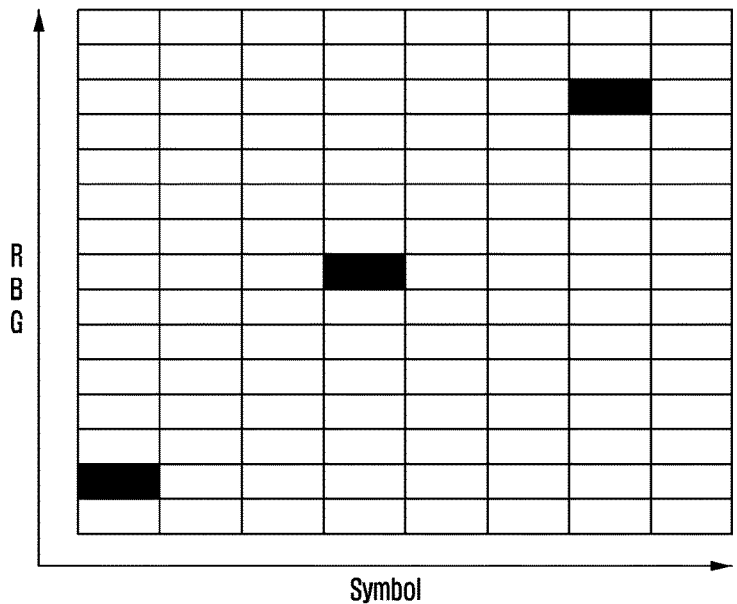
Available PRACH Transmission occasion Wi-Fi sub-bands
[Fig. 10]
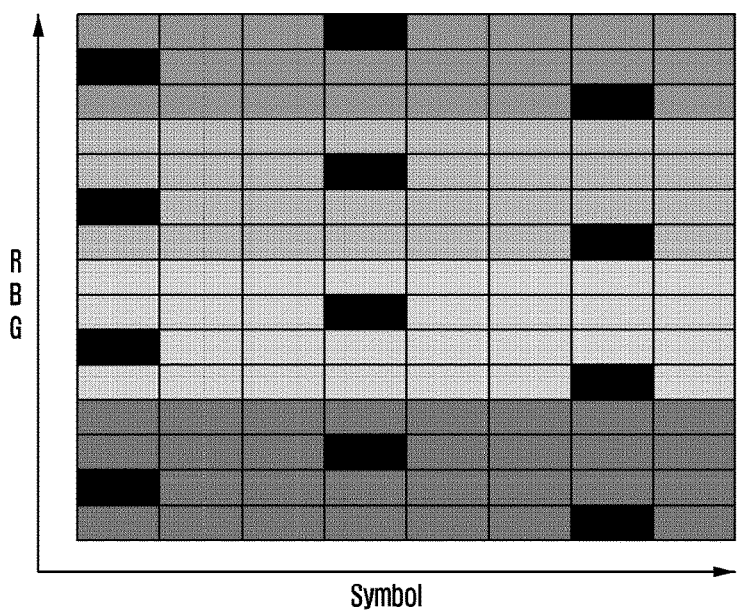
Available PRACH Transmission occasion Wi-Fi sub-bands

METHOD AND SYSTEM FOR PERFORMING RANDOM ACCESS CHANNEL PROCEDURE FOR UNLICENSED OPERATION

CROSS-REFERENCE TO RELATED APPLICATIONS

This application is a 371 of International Application No. PCT/KR2019/009967 filed on Aug. 8, 2019, which claims priority to India patent application No. 201841029871 filed on Aug. 8, 2018 and India patent application No. 201841029871 filed on Aug. 6, 2019, the disclosures of which are herein incorporated by reference in their entirety.

BACKGROUND

1. Field

The present disclosure relates to a four step Random Access Channel (RACH) and more specifically to Method and System for performing random access channel procedure for unlicensed operation. The present application is based on, and claims priority from an Indian application No. 201841029871 filed on 8 Aug. 2018, the disclosure of which is hereby incorporated by reference herein.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Random access procedure begins by selection of an appropriate RACH preamble for Physical Random Access Channel (PRACH) transmission. Currently RACH preamble selection is based on selected downlink beam wherein the downlink beam is selected by UE based on Reference Signal Received Power (RSRP) of Synchronization Signal Block (SSB) for the SSB based DL beam or RSRP of the Channel State Information Referenced Signal (CSI-RS) for the CSI-RS based DL beam. However unlike licensed operation, for unlicensed operation the performance of a downlink beam for data transfer depends not only on RSRP of SSB/CSI-RS and but also depends on congestion. Hence there is a need to expand DL Beam selection criteria beyond RSRP for unlicensed operation.

FIG. 1 is a flow diagram of the conventional 4-step contention based random access procedure. Random access procedure involves transmission of RACH preamble in specified time-frequency resource in both Long Term Evolution (LTE) and New Radio (NR). RACH configuration configured by the base station has one or many time domain resources and one frequency domain resource per time domain resource for preamble transmission. The time and frequency resource in which RACH preamble is transmitted is referred as RACH occasion (RO). The UE Media Access Control (MAC) layer selects a RACH resource (i.e. a RACH preamble and a RO) for PRACH transmission and indicates it to the physical layer for PRACH transmission. However, before the actual transmission physical layer needs to perform Listen Before Talk (LBT) procedure to make sure that channel is free during the selected RO. If LBT fails (i.e. channel is busy) then PRACH transmission also fails (i.e. physical layer does not transmit PRACH) and UE MAC Layer has to perform whole process again. Hence we need to design better PRACH transmission patterns or opportunities to increase the reliability or possibility of successful PRACH transmission.

After successful PRACH reception (i.e. reception of random access preamble transmitted by UE), gNB/eNB schedules message3 (or Msg3) transmission via UL grant in random access response (RAR). However for unlicensed operation it is possible that because of LBT failure UE is not able to transmit message3 in UL grant received in RAR. This may result in delay in completion of random access procedure. Hence we need to modify or optimize message3 scheduling to increase the reliability or possibility of successful random access procedure.

FIG. 2 is a flow diagram illustrating, a conventional method for beam selection. The conventional method determines a Reference Signal Received Power (RSRP) and compares with a threshold value of RSRP provided by the gNB. Further the method selects the beam based on some implementation parameters.

Thus, it is desired to address the above mentioned disadvantages or other shortcomings or at least provide a useful alternative for random access procedure in an LBT based NR/LTE unlicensed cellular system where various transmission of messages in random access procedure can fail due to channel congestion.

The principal object of the embodiments herein is to provide a method and system for performing random access channel procedure for unlicensed operation in a wireless network.

Another object of the embodiment herein is to determine a first measurement metric value and a second measurement metric value.

Another object of the embodiment herein is to compare the determined first measurement metric value with a first measurement metric threshold and determine one of a first set of SSBs and a first set of CSI-RS.

Another object of the embodiment herein is to compare the determined second measurement metric value with a second measurement metric threshold and determine one of a second set of SSBs and a second set of CSI-RS.

Another object of the invention herein is determine a selection criteria based at least of a RACH occasion, a RACH channel availability, a best value of the first measurement metric, and the best value of the second measurement metric.

Another object of the invention herein is to determine one of a candidate set of CSI-RS and a candidate set of SSBs based on the selection criteria.

Another object of the invention is to receive a RAR in response to a PRACH preamble comprising a plurality of uplink grants.

Another object of the invention is to receive one or more RAR grants in response to the PRACH preamble comprising a plurality of uplink grants.

Another object of the invention is to performs an uplink transmission if a channel status based on Listen Before Talk (LBT) is free for the corresponding UL grant is free.

SUMMARY

In an embodiment the selecting, by the UE one of the first set of SSBs and the first set of CSI-RSs from one of the plurality of SSBs and plurality of CSI-RSs based on the first measurement metric comprises: comparing the first measurement metric values of one of the plurality of SSBs and the plurality of CSI-RSs to a first measurement metric threshold. The selecting further includes selecting one of the first set of SSBs and the first set of CSI-RSs from one of the plurality of SSBs and plurality of CSI-RSs that meets the first measurement metric threshold based on the comparison.

In another embodiment selecting one of the second set of SSBs and the second set of CSI-RSs from one of the first set of SSBs and the first set of CSI-RSs based on the second measurement metric comprises comparing the second measurement metric values of one the first set of SSBs and the first set of CSI-RSs to the second measurement metric threshold. The selecting further comprises selecting one of the second set of SSBs and the second set of CSI-RSs from one of the first set of SSBs and the first set of CSI-RSs having second measurement metric greater than the second measurement metric threshold based on the comparison.

In an embodiment the selection criteria is determined based on at least one of a RACH occasion, a RACH channel availability, a best value of the first measurement metric, and the best value of the second measurement metric. The first measurement metric is at least one of a Reference Signal Strength Indicator (RSSI), channel occupancy, channel congestion and a priority information associated with one of the SSBs and the CSI-RSs. The second measurement metric is a Reference Signal Resource Power (RSRP).

In an embodiment the method further includes selecting, by the UE, a PRACH preamble and a PRACH occasion based on one of the at least one candidate SSBs and the at least one candidate CSI-RS, selecting a PRACH resource for PRACH preamble transmission, configuring the PRACH resource based on the PRACH occasion and the PRACH preamble, and transmitting the PRACH preamble using the configured PRACH resource.

In another embodiment the method further includes receiving, by the UE, a Random Access Response (RAR) in response to the PRACH preamble, wherein the RAR comprises a plurality of uplink (UL) grants (UL) and transmitting, by the UE, uplink transmission in the UL grants received in RAR based on a channel status.

In another embodiment the method further includes receiving one or more RARs in response to the PRACH preamble, wherein a RAR comprises an uplink grant and transmitting, by the UE, uplink transmission in a UL grant received in one of the RARs based on the channel status.

In yet another embodiment the UE performs the uplink transmission if the channel status based on Listen Before Talk (LBT) is free for the corresponding UL grant is free.

The invention provides a method and system for method for performing random access channel procedure by a User Equipment (UE) for unlicensed operation in a wireless network. The method includes determining a first measurement metric value for one of a plurality of SSBs (Synchronization Signal Block) and a plurality of CSI-RSs (Channel State Information-Reference Signal). The method further includes comparing the first measurement metric value of one of the plurality of SSBs and the plurality of CSI-RSs to a first measurement metric threshold. The method also includes determining whether one of a single SSBs and a single CSI-RSs from the plurality of plurality of SSBs and the plurality of CSI-RSs, a first set of one of the plurality of SSBs and the plurality of CSI-RSs, and none of the SSBs and the CSI-Rs from plurality of SSBs and the plurality of CSI-RSs meets the first measurement metric threshold based on the comparison. The method also includes selecting by the UE one of the single SSBs and the single CSI-RSs for the RACH procedure in response to determining that one of the single SSBs and the single CSI-RSs from the plurality of SSBs and the plurality of CSI-RSs meets the first measurement metric threshold.

In another embodiment the method includes selecting one of a candidate SSBs and a candidate CSI-RSs from one of the first set of SSBs and the first set of CSI-RSs for the RACH procedure in response to determining that one of the first set SSBs and the first set of CSI-RSs meets the first measurement metric threshold. In another embodiment the method includes selecting, by the UE, one of a candidate SSBs and a candidate CSI-RSs from one of the plurality of SSBs and the plurality of CSI-RSs for the RACH procedure in response to determining that none of the channels from the plurality of CSI-RS and the plurality of SSBs meets the first measurement metric threshold.

In an embodiment selecting one of the candidate SSBs and the candidate CSI-RSs from one of the first set of SSBs and the first set of CSI-RS for the RACH procedure in response to determining that one of the first set of SSBs and the first set of CSI-RSs meets the first measurement metric threshold comprises determining a second measurement metric for one of the first set of SSBs and the first set of CSI-RSs. The selecting further includes comparing the second measurement metric of one of the first set of SSBs and the first set of CSI-RSs to a second measurement metric threshold. The selecting further includes determining whether one of a single SSBs and a single CSI-RSs from one of the first set of SSBs and the first set of CSI-RSs, one of a second set of SSBs and a second set of CSI-RSs from the one of the first set of SSBs and the first set of CSI-RSs, and none of the channels from one of the first set of SSBs and the first set of CSI-RSs meets the second measurement metric threshold based on the comparison. The method further includes selecting one of the single SSBs and the single CSI-RSs for the RACH procedure in response to determining that one of the single SSBs and the single CSI-RSs from the first one of the first set of SSBs and the first set of CSI-RSs meets the second measurement metric threshold.

The method also includes selecting one of the candidate SSBs and the candidate CSI-RSs from one of the second set of SSBs and the second set of CSI-RSs for the RACH procedure in response to determining that one of the second set of SSBs and the second set of CSI-RSs meets the second measurement metric threshold. The method also includes selecting one of the candidate SSBs and the candidate CSI-RSs from one of the first set of SSBs and the first set of CSI-RSs for the RACH procedure in response to determining that none of the SSBs and the CSI-RS from the first set of CSI-RS and the first set of SSBs meets the second measurement metric threshold.

In an embodiment selecting one of the candidate SSBs and the candidate CSI-RS from one of the second set of SSBs and the second set of CSI-RSs for the RACH procedure in response to determining that one of the second set of SSBs and the second set of CSI-RSs meets the second measurement metric threshold comprises determining a selection criteria based on at least one of a RACH occasion, a RACH channel availability, a best value of the first measurement metric, and a best value of the second measurement metric and selecting one of the candidate SSBs and the candidate CSI-RSs from one of the second set of SSBs and the second set of CSI-RS for the RACH procedure based on the selection criteria.

In another embodiment selecting one of the candidate SSBs and the candidate CSI-RS from one of the first set of SSBs and the first set of CSI-RSs for the RACH procedure in response to determining that one of the first set of SSBs and the first set of CSI-RSs meets the second measurement metric threshold comprises determining, by the UE (300), a selection criteria based on at least one of a RACH occasion, a RACH channel availability, a best value of the first measurement metric, and a best value of the second measurement metric. The method also includes selecting one of the candidate SSBs and the candidate CSI-RSs from one of the first set of SSBs and the first set of CSI-RS for the RACH procedure based on the selection criteria.

In yet another embodiment selecting one of the candidate SSBs and the candidate CSI-RS from one of the plurality of SSBs and the plurality of CSI-RSs for the RACH procedure in response to determining that none of the SSBs and the CSI-RS from the plurality of SSBs and the plurality of CSI-RSs meets the second measurement metric threshold comprises determining selection criteria based on at least one of a RACH occasion, a RACH channel availability, a best value of the first measurement metric, and a best value of the second measurement metric. The method further includes selecting one of the candidate SSBs and the candidate CSI-RS from one of the plurality of SSBs and the plurality of CSI-RSs for the RACH procedure based on the selection criteria.

Accordingly, the invention provides a UE in a wireless network for performing random access channel procedure for unlicensed operation. The UE includes a memory, a processor, and a communicator. The processor is configured to determine a first measurement metric value and a second measurement metric value for one of a plurality of SSBs (Synchronization Signal Block) and a plurality of CSI-RSs (Channel State Information-Reference Signal).

The processor is also configured to select one of a first set of SSBs and a first set of CSI-RSs from one of the plurality of SSBs and the plurality of CSI-RSs based on the first measurement metric and select one of a second set of SSBs and a second set of CSI-RSs from one of the first set of SSBs and the first set of CSI-RSs based on the second measurement metric. The processor is further configured to determine a selection criteria and select one of at least one candidate SSBs and at least one candidate CSI RS from one of the second set of SSBs and the second set of CSI-RSs based on the selection criteria.

Accordingly, the invention provides a UE in a wireless network for performing random access channel procedure for unlicensed operation. The UE includes a memory, a processor, and a communicator. The processor is configured to determine a first measurement metric value for one of a plurality of SSBs (Synchronization Signal Block) and a plurality of CSI-RSs (Channel State Information-Reference Signal) and compare the first measurement metric value of one of the plurality of SSBs and the plurality of CSI-RSs to a first measurement metric threshold. The processor if further configured to determine whether one of a single SSBs and single CSI-RSs from the plurality of plurality of SSBs and the plurality of CSI-RSs, a first set of one of the plurality of SSBs and the plurality of CSI-RSs, and none of the SSBs and the CSI-Rs from plurality of SSBs and the plurality of CSI-RSs meets the first measurement metric threshold based on the comparison.

The processor is further configured to select one of the single SSBs and the single CSI-RSs for the RACH procedure in response to determining that one of the single SSBs and the single CSI-RSs from the plurality of SSBs and the plurality of CSI-RSs meets the first measurement metric threshold. The processor is also configured to select one of a candidate SSBs and a candidate CSI-RSs from one of the first set of SSBs and the first set of CSI-RSs for the RACH procedure in response to determining that one of the first set SSBs and the first set of CSI-RSs meets the first measurement metric threshold. The processor is further configured to select one of a candidate SSBs and a candidate CSI-RSs from one of the plurality of SSBs and the plurality of CSI-RSs for the RACH procedure in response to determining that none of the channels from the plurality of CSI-RS and the plurality of SSBs meets the first measurement metric threshold.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Accordingly the invention provides a method and system for performing random access procedure by a User Equipment (UE) for unlicensed operation in a wireless network. The method comprises determining, by the UE, a first measurement metric value and a second measurement metric value for one of a plurality of SSBs (Synchronization Signal Block) and a plurality of CSI-RSs (Channel State Information-Reference Signal). The method further includes selecting one of a first set of SSBs and a first set of CSI-RSs from one of the plurality of SSBs and the plurality of CSI-RSs based on the first measurement metric. The method also includes selecting one of a second set of SSBs and a second set of CSI-RSs from one of the first set of SSBs and the first set of CSI-RSs based on the second measurement metric. The method further includes determining a selection criteria and selecting one of at least one candidate SSBs and at least one candidate CSI RS from one of the second set of SSBs and the second set of CSI-RSs based on the selection criteria.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIG. 1 is a flow diagram of an existing method, illustrating a 4-steps random access channel procedure, according to a prior art;

FIG. 2 is a flow diagram, illustrating a conventional method for beam selection in the RACH, according to an embodiment as disclosed herein;

FIG. 3 is a block diagram of a UE for performing random access channel procedure for unlicensed operation in a wireless network, according to an embodiment as disclosed herein;

FIG. 4 is a flow diagram illustrating a proposed method for beam selection in the RACH procedure, according to an embodiment as disclosed herein;

FIG. 5 is a schematic diagram, illustrating a PRACH Repetition Bundle resource configuration where each PRACH Repetition Bundle is associated with a set of PRACH occasion numbers, according to an embodiment as disclosed herein;

FIG. 6 is a schematic diagram, illustrating an example, wherein the grant is received with a grant periodicity of 4 SFN, according to an embodiment as disclosed herein;

FIG. 7 is a sequence diagram, illustrating a method for RAR monitoring and receiving plurality of UL grant, according to an embodiment as disclosed herein;

FIG. 8 is a sequence diagram, illustrating a method for RAR monitoring and a UL grant, according to an embodiment as disclosed herein;

FIG. 9 is a schematic diagram, illustrating availability of occasion for conventional method, according to an embodiment as disclosed herein;

FIG. 10 is a schematic diagram, illustrating availability of occasion for proposed method, according to an embodiment as disclosed herein.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The present disclosure describes the terms as given below.
NR: New Radio synonymous to 5G
  RAR: Random Access Response
  DCI: Downlink Control Information
  PRACH: Physical Random Access Channel
  PDCCH: Physical Downlink Control Channel
  RRC: Radio Resource Control
  LBT: Listen Before Talk
  CORESET: Control Resource Set
  SI: System Information
  MCOT: Maximum channel occupancy time (the maximum amount of time that a device
  can reserve an unlicensed channel for transmissions)
  RB: Resource Block
  RBG: Group of Resource Block's
  SFN: System Frame Number
  Message3: Third message of Random Access Procedure
  Message4: Fourth message of Random Access Procedure.

The embodiments herein disclose a method and system for method for performing random access channel procedure by a User Equipment (UE) for unlicensed operation in a wireless network. The method comprises determining a first measurement metric value and a second measurement metric value for one of a plurality of SSBs (Synchronization Signal Block) and a plurality of CSI-RSs (Channel State Information-Reference Signal). The method further includes selecting one of a first set of SSBs and a first set of CSI-RSs from one of the plurality of SSBs and the plurality of CSI-RSs based on the first measurement metric. The method also includes selecting one of a second set of SSBs and a second set of CSI-RSs from one of the first set of SSBs and the first set of CSI-RSs based on the second measurement metric. The method further includes determining a selection criteria and selecting one of at least one candidate SSBs and at least one candidate CSI RS from one of the second set of SSBs and the second set of CSI-RSs based on the selection criteria.

Unlike conventional methods and systems, the proposed method includes a beam congestion parameter for selection a downlink beam in a unlicensed spectrum. The method and systems also provides Enhanced PRACH transmission for LBT based LTE/NR unlicensed operation.

Referring now to the drawings, and more particularly to FIG. 3 through 10, where similar reference characters denote corresponding features consistently throughout the figures, there are shown preferred embodiments.

FIG. 3 is a block diagram, illustrating a UE 300 for performing random access channel procedure for unlicensed operation in a wireless network. Thee wireless network comprises a gNB 302 (not shown in FIG. 3) and the UE 300. The examples of the electronic device 300 are, but not limited to a smart phone, a tablet computer, a personal computer, a desktop computer, a mobile device, a personal digital assistance (PDA), a multimedia device, an Internet of Things (IoT) device, and the like. The electronic device 300 comprises a memory 310, a processor 320, a communicator 330, and a beam selector 340. The processor 320 is coupled to the memory 110, the communicator 130, and the beam selector 140. The processor 320 is configured to execute instructions stored in the memory 310 and to perform various other functions.

In an embodiment the UE 300 receives a plurality of beams from the gNB. The plurality of beams includes a plurality of Synchronization Signal Block (SSB) and/or a plurality of the Channel State Information-Reference Signal (CSI-RS). The beam selector 340 is configured to determine a first measurement metric value and a second measurement metric value for one of the plurality of SSBs and/or the plurality of CSI-RSs. The first measurement metric is one of a Reference Signal Strength Indicator (RSSI), a channel occupancy, a channel congestion and a priority information associated with one of the SSBs and the CSI-RSs. The second measurement metric is a Reference Signal Received Power (RSRP). The beam selector is further configured to compare the determined first metric value for the plurality of SSBs and/or the plurality of CSI-RSs with a first measurement metric threshold. The UE 300 then selects a first set of SSBs/CSI-RS from the plurality of SSBs/CSI-RS, wherein the first set of SSBs/CSI-RS have greater first measurement metric value than the first measurement metric threshold. The Beam selector 340 is further configured to select a second set of the SSBs/CSI-RS from the first set of SSBs/CSI-RS based on the second measurement metric value. The UE 300 compares the determined second measurement metric with a second measurement metric threshold. The UE 300 receives the second measurement metric threshold from the gNB 302. After determining the first set of SSBs/CSI-RSs and the second set of SSBs/CSI-RSs, the UE 300 is configured to determine selection criteria. The selection criteria comprise a plurality of parameters. The plurality of parameters a RACH occasion, a RACH channel availability, a best value of the first measurement metric, and the best value of the second measurement metric.

The beam selector 340 is configured to determine a candidate SSBs/CSI-RS from the second set of SSBs/CSI-RS based on the selection criteria.

In an embodiment, after determining the candidate set of SSBs/CSI-RS the UE 300 is configured to select a PRACH resource for PRACH preamble transmission. After selecting the PRACH resource the UE configures the selected PRACH resources and transmits the PRACH preamble using the configured PRACH resource.

After transmitting the PRACH preamble, the UE 300 is configured to receive a Random Access Response (RAR) in response to the PRACH preamble. The RAR comprises a plurality of uplink (UL) grants. Based on the UL grants the UE 300 transmits uplink transmission based on a channel status information.

In yet another embodiment the UE 300 may receive one or more RARs in response to the PRACH preamble. The UE 300 performs the uplink transmission if the channel status based on Listen Before Talk (LBT) is free for the corresponding UL grant is free.

The communicator 130 is configured for communicating internally between internal units and with external devices via one or more networks. The memory 110 may include one or more computer-readable storage media. The memory 110 may include non-volatile storage elements. Examples of such non-volatile storage elements may include magnetic hard disc, optical discs, floppy discs, flash memories, or forms of electrically programmable memories (EPROM) or electrically erasable and programmable (EEPROM) memories. In addition, the memory 110 may, in some examples, be considered a non-transitory storage medium. The term "non-transitory" may indicate that the storage medium is not embodied in a carrier wave or a propagated signal. However, the term "non-transitory" should not be interpreted that the memory 110 is non-movable. In some examples, the memory 100 can be configured to store larger amounts of information than a memory. In certain examples, a non-transitory storage medium may store data that can, over time, change (e.g., in Random Access Memory (RAM) or cache).

Although FIG. 3 shows the limited overview of the UE 100 but, it is to be understood that other embodiments are not limited thereto. Further, the UE 100 may include any number of hardware or software components communicating with each other. By way of illustration, both an application running on a device and the device itself can be a component.

FIG. 4 is a schematic diagram, illustrating a method for selecting the downlink beam. As seen in FIG. 4, at 410, the UE performs the measurement for the first metric. At 412, the UE 300 performs the measurement for the second metric. At, 414, the UE 300 receives the first metric threshold and the second metric threshold from the gNB 302 (shown in FIG. 7). The UE 300 compares the measured values for the first metric with the first metric threshold and the measured values for the second metric with the second metric threshold. The UE 300 selects the first set of beams having measured values greater than the first metric threshold, from the plurality of beams. The UE 300 determines the second set of beams, from the first set of beams, such that the second set of beams have greater second metric values than the second threshold value. After determining the second set of values, at 416, the UE 100 selects one more beams based on the selection criteria. In an embodiment, the selection criteria comprises at least one of a Earliest RACH occasion 416*a*, the channel availability, the best value of the first measurement metric 416*c*, and a best value of the second measurement metric value.

Network Configuration for Beam Selection

In an embodiment, the gNB 302 configures the UE 300 with one or more reference signal strength indicator (RSSI) measurement configurations and provide a parameter DL_Beam_RSSI_Threshold associated with a PRACH resource configuration. The gNB 302 can configure one or more resource configurations within a RSSI measurement configuration. Each such resource configuration includes time domain (e.g. time offset and or periodicity and or time interval) and or frequency domain (e.g. frequency range or RB or RBG or ARFCN or cell identifier) occasions, and is associated with one or more beams and or SSB indices and or CSI-RS resources. For e.g. resource configuration can be associated with a set of TCI states, which is further associated to one or more SSB indices or CSI-RS resources. If no association is provided between resource configuration and a beam or SSB index or CSI-RS resource, then UE assumes that the given resource configuration is applicable for all the beams or SSB indices or CSI-RS resources. For determining RSSI corresponding to a beam or SSB index or CSI-RS resource, UE can perform RSSI measurements on the time or frequency occasions provided in the resource configuration associated with the given beam or SSB index or CSI-RS resource. If UE is not configured with any resource configuration then UE selects random time occasions on the frequency of the PRACH resource for RSSI measurements.

Each RSSI measurement configuration can be provided within system information and associated with a set of PRACH resources, in which case UE is expected to perform RSSI measurements before initiating PRACH procedure on the associated PRACH resources without waiting for any other activation message from the network.

Each RSSI measurement configuration can be provided using dedicated RRC configuration to the UE 300 (i.e. UE specific configuration). In an embodiment the UE 300 perform RSSI measurements before initiating PRACH procedure on the given PRACH resources.

In another embodiment the gNB 302 transmits a RRC message or MAC CE or Layer-1 activation message which includes a RSSI measurement configuration identity, triggering the UE 300 to perform RSSI measurements according to the provided configuration for the given RSSI measurement configuration identity.

For RSSI measurement, the UE 300 performs average signal strength estimation for any received signal in the time/frequency occasions indicated by the cellular network.

For RSSI measurement corresponding to a SSB or CSI-RS, the UE 300 assumes same QCL assumption (e.g. spatial QCL or UE beam) for RSSI measurement as used for given SSB/CSI-RS reception. If TCI state is explicitly provided for RSSI measurement, then UE uses QCL assumption according to the provided TCI state.

In another embodiment, the gNB 302 configures the UE 300 with one or more channel occupancy measurement configurations and provide a parameter DL_Beam_COT_Threshold associated with a PRACH resource configuration. The gNB 302 configures one or more resource configurations within a channel occupancy measurement configuration. Each such resource configuration includes time domain (e.g. time offset and or periodicity and or time interval) and or frequency domain (e.g. frequency range or RB or RBG or ARFCN or cell identifier) occasions associated one or more beams and or SSB indices and or CSI-RS resources. For e.g. resource configuration can be associated with a set of TCI states, which is further associated to one or more SSB indices or CSI-RS resources. If no association is provided between resource configuration and a beam or SSB index or CSI-RS resource, then UE assumes that the given resource configuration is applicable for all the beams or SSB indices or CSI-RS resources. For determining channel occupancy corresponding to a beam or SSB index or CSI-RS resource, the UE 300 perform channel occupancy measurements on the time or frequency occasions provided in the resource configuration associated with the given beam or SSB index or CSI-RS resource. If the UE 300 is not configured with any resource configuration then the UE 300 selects random time occasions on the frequency of the PRACH resource for channel occupancy measurements.

Each channel occupancy measurement configuration can be provided within system information and associated with a set of PRACH resources, in which case the UE 300 is expected to perform channel occupancy measurements before initiating PRACH procedure without waiting for any other activation message from the network.

Each channel occupancy measurement configuration can be provided using dedicated RRC configuration to the UE 300 (i.e. UE specific configuration). In an embodiment the UE 300 performs channel occupancy measurements before initiating PRACH procedure on the given PRACH resources.

In another solution, the gNB 302 transmits a RRC message or MAC CE or Layer-1 activation message which includes a channel occupancy measurement configuration identity, triggering the UE to perform channel occupancy measurements according to the provided configuration for the given channel occupancy measurement configuration identity.

For channel occupancy measurement, the UE 300 performs signal strength estimation for any received signal in the time or frequency occasions indicated by the cellular network. Channel occupancy metric is determined as the ratio of time that signal strength received by the UE 300 in the indicated time occasions is greater than a threshold value. The threshold value is preconfigured or configured by the cellular network.

The threshold value can be configured separately for measurements associated with CSI-RS and measurements associated with SSB. The threshold value can be specified per PRACH resource configuration. The threshold value can be specified per frequency range or frequency band.

For channel occupancy measurement corresponding to a SSB or CSI-RS, the UE 300 assumes same QCL assumption (e.g. spatial QCL or UE beam) for channel occupancy measurement as used for given SSB or CSI-RS reception. If TCI state is explicitly provided for channel occupancy measurement, then UE uses QCL assumption according to the provided TCI state.

In another embodiment, the gNB 302 provides channel congestion information per beam or SS block index or CSI-RS resource using system information or MAC CE or physical layer signaling and provide a parameter DL_Beam_Congestion_Threshhold.

In another embodiment, the gNB 302 provides priority information per beam or SS block index or CSI-RS resource and configure a parameter DL_Beam_Min_Priority.

For a given cell or frequency range, the gNB 302 provide channel access parameters which can be associated to one or more beam or SSB index or CSI-RS resource. Based on the provided channel access parameters, the UE 300 can determine a priority value associated with each beam or SSB index or CSI-RS resource. In one solution, channel access parameter provided by gNB is a priority value. UE directly applies the priority value for each beam or SSB or CSI-RS resource as provided by gNB. In another solution, channel access parameter provided by gNB is a channel access priority which is used by a UE to perform LBT operation. The UE 300 directly applies the priority value for each beam or SSB or CSI-RS resource as the channel access priority provided by the gNB 302.

In another embodiment the channel access parameter provided by the gNB 302 is contention window size (minimum limit and/or maximum limit) which is used by the UE 300 to perform LBT operation. The priority value assigned by the UE 300 for a beam or SSB or CSI-RS resource decreases as configured contention window size increases (i.e. priority value are inversely related to contention window size). In another embodiment the channel access parameter provided by the gNB 302 is MCOT size (minimum limit and or maximum limit) which is used by the UE 300 to perform LBT operation. The priority value assigned by the UE 300 for a beam or SSB or CSI-RS resource decreases as configured MCOT size increases (i.e. priority value are inversely related to MCOT size).

The gNB 302 provides channel access parameter information either via system information or dedicated RRC configuration per cell or MAC CE or physical layer signaling. In another embodiment, gNB 302 broadcasts or transmits Beam_Priority_Initial and DL_Beam_Priority_Threshold.

UE Procedure for Beam Selection Based on Network Configuration:

In an embodiment, the gNB 302 instructs the UE 300 to perform RSSI measurements associated with the beam and provides the UE 300 with a RSSI threshold value and a RSRP (or RSRQ) threshold value. The UE 300 performs the RSSI measurement for the plurality of SSB/CSI-RSs. The UE 300 selects the first set of one or more beams (SSBs/CSI-RSs) from the plurality of beams (SSBs/CSI-RSs), wherein the first set of beams (SSBs/CSI-RSs) has higher RSSI value than the RSSI threshold value. The UE 300, further selects the second set of beams (SSB/CSI-RSs) from the first set of beams (SSB/CSI-RSs), wherein the second set of beams (SSB/CSI-RSs) have higher RSRP (or RSRQ) value than the RSRP (or RSRQ) threshold value. Further, the UE 300 select a candidate beam (SSB/CSI-RS) from the second set of beams (SSBs/CSI-RSs) such that the candidate beam (SSB/CSI-RS) has the highest RSSI value. The UE 300 may also select a candidate beam (SSB/CSI-RS) randomly from the second set of beams (SSBs/CSI-RSs). The UE 300 may also select from the second set of beams (SSBs/CSI-RSs) a candidate beam (SSB/CSI-RS) having an earliest PRACH occasion. The UE 300 may also select from the second set of beams (SSBs/CSI-RSs) any beam (SSB/CSI-RS) as candidate beam (SSB/CSI-RS).

In an embodiment if, no such first set of beams (SSBs/CSI-RSs), with RSSI value greater than the RSSI threshold value is available, then the UE 300 select a candidate beam (SSB/CSI-RS) such that candidate beam (SSB/CSI-RS) have higher RSRP value than the RSRP threshold value. If no such candidate beam (SSB/CSI-RS) having higher RSRP (or RSRQ) value than the RSRP (or RSRQ) threshold value is available, UE 300 select a candidate beam (SSB/CSI-RS) having highest RSSI value. In another embodiment, the gNB 302 instructs the UE 300 to perform channel occupancy measurements associated with the beams (SSBs/CSI-RSs) and provides the UE 300 with a channel occupancy threshold value and the RSRP (or RSRQ) threshold value. The UE 300 performs the channel occupancy measurement for the plurality of beams (SSB/CSI-RSs). The UE 300 selects the first set of beams (SSBs/CSI-RSs) from the plurality of beams (SSBs/CSI-RSs), wherein the first set of beams (SSBs/CSI-RSs) has lower channel occupancy value than the channel occupancy threshold value. The UE 300, further selects the second set of beams (SSBs/CSI-RSs) from the first set of beams (SSBs/CSI-RSs), wherein the second set of beams (SSBs/CSI-RSs) have higher RSRP (or RSRQ) value than the RSRP (or RSRQ) threshold value. Further, the UE 300 select from the second set of beams (SSBs/CSI-RSs) the candidate beam (SSB/CSI-RS) from the second set of beams (SSBs/CSI-RSs) such that the candidate beam (SSB/CSI-RS) have the lowest channel occupancy value. Alternately, the UE 300 select from the second set of beams (SSBs/CSI-RSs) the candidate beam (SSB/CSI-RS) having highest RSRP (or RSRQ). Alternately the UE 300 select from the second set of beams (SSBs/CSI-RSs) the candidate beam (SSB/CSI-RS) randomly. The UE 300 select from the second set of beams (SSBs/CSI-RSs) the candidate beam (SSB/CSI-RS) having an earliest PRACH occasion.

In an embodiment if, no such first set of beams (SSBs/CSI-RSs), with channel occupancy value lower than the channel occupancy threshold value is available, then the UE 300 selects a beams from the plurality of beams, such that selected beam (SSB/CSI-RS) have higher RSRP (or RSRQ) value than the RSRP (or RSRQ) threshold value. If no such candidate beam (SSB/CSI-RS) having higher RSRP (or RSRQ) value than the RSRP (or RSRQ) threshold value is available, UE 300 select a candidate beam (SSB/CSI-RS) having lowest channel occupancy measurement value. In another embodiment, the gNB provides the UE 300 with a channel congestion value, a channel congestion threshold value and the RSRP (or RSRQ) threshold value for the plurality of beams (SSBs/CSI-RS). The UE 300 selects the first set of beams (SSBs/CSI-RSS) based on the plurality of beams (SSBs/CSI-RSs), wherein the first set of beams (SSBs/CSI-RSs) has lower channel congestion value than the channel congestion threshold value. The UE 300, further selects the second set of beams (SSBs/CSI-RSs) from the first set of beams (SSBs/CSI-RSs), wherein the second set of beams (SSBs/CSI-RSs) have higher RSRP (or RSRQ) value than the RSRP (or RSRQ) threshold value. Further, the UE 300 select a candidate beam (SSB/CSI-RS) from the second set of beams (SSBs/CSI-RSs) such that the candidate beam (SSB/CSI-RSs) have the highest RSSI value. Alternatively, the UE 300 select the candidate beam (SSB/CSI-RS) randomly from the second set of beams (SSBs/CSI-RSs). Alternatively, the UE 300 select the candidate beam (SSB/CSI-RS) having an earliest PRACH occasion from the second set of beams (SSBs/CSI-RSs).

In an embodiment if, no such first set of beams (SSBs/CSI-RSs), with channel congestion value lower than the channel congestion threshold value is available, then the UE 300 select a beam from the plurality of beams, such that the selected beam (SSB/CSI-RS) have higher RSRP (or RSRQ) value than the RSRP (or RSRQ) threshold value. If no such candidate beam (SSB/CSI-RS) having higher RSRP (or RSRQ) value than the RSRP (or RSRQ) threshold value is available, UE 300 select a candidate beam (SSB/CSI-RS) having lowest channel congestion value.

In another embodiment, the gNB provides priority information per beam (SSB/CSI-RS) and a minimum beam priority to the UE 300 and the RSRP (or RSRQ) threshold value for the plurality of beams (SSB/CSI-RS). The UE 300 selects the first set of beams (SSBs/CSI-RSS) from the plurality of beams (SSBs/CSI-RSs), wherein the first set of beams (SSBs/CSI-RSs) have beam priority greater than a minimum beam priority. The UE 300, further selects the second set of beams (SSBs/CSI-RSs) from the first set of beams (SSBs/CSI-RSs), wherein the second set of beams (SSBs/CSI-RSs) have higher RSRP (or RSRQ) value than the RSRP (or RSRQ) threshold value. Further, the UE 300 select a candidate beam (SSB/CSI-RS) from the second set of beams (SSBs/CSI-RSs) such that the candidate beam (SSB/CSI-RS) have the lowest congestion value. The UE 300 select the candidate beam (SSB/CSI-RS) randomly from the second set of beams (SSBs/CSI-RSs). The UE 300 select the candidate beam (SSB/CSI-RS) having an earliest PRACH occasion from the second set of beams (SSBs/CSI-RSs). The UE 300 select the candidate beam (SSB/CSI-RS) having lowest values of congestion from the second set of beams (SSBs/CSI-RSs).

In an embodiment if, no such first set of beams (SSBs/CSI-RSs), with beam congestion value lesser than the beam congestion threshold value is available, then the UE 300 selects a beam from the plurality of beams, such that the selected beam (SSB/CSI-RS) have higher RSRP value than the RSRP threshold value.

In another embodiment, if the gNB 302 provides DL_Beam_Priority_Threshold, then UE 300 shall initialize Beam_Priority for each beam to Beam_Priority_Initial (provided by gNB), UE 300 selects a DL Beam with RSRP of SSB or CSI-RS>RSRP-ThresholdSSB or CSIR-Threshold. If UE 300 is unable to send PRACH transmission due to LBT Failure then, UE 300 shall reduce the Beam_priority of selected downlink beam by 1 and perform DL beam selection again.

In another embodiment, UE can use one or more of the above mentioned methods by applying multiple selection criteria's sequentially and reducing the subset of candidate beams before making the final DL beam selection.

UE 300 Procedure for PRACH Resource Selection Based on LBT.

In an embodiment, the UE 300 select PRACH resource based on Listen Before Talk (LBT) technique for PRACH preamble transmission. The PRACH resource selection is of two types: contention based PRACH and contention free PRACH.

The UE 300 may apply the procedure, for PRACH resource selection based on LBT, in addition with the selection of candidate beams (SSB/CSI-Rs) or may perform the procedure separately.

Contention Based PRACH:

In one embodiment, the UE 300 checks a channel status of the PRACH occasion corresponding to each beam (SSB/CSI-RS) of the plurality of beams (SSBs/CSI-RSs) having the signal strength greater than a signal strength threshold. In an embodiment the signal strength may be determined by measuring at least one of the RSSI value, the RSRQ value and the RSSP value. The UE 300 selects the beam (SSB/CSI-RS) if the channel status of the associated PRACH occasion is free. Further if the PRACH occasion is free for the plurality of beams (SSBs/CSI-RSs) then the UE select the beam (SSB/CSI-RS) whose PRACH occasion occurs first in time. In another embodiment if the PRACH occasion is free for the plurality of beams (SSBs/CSI-RSs) the UE 300 randomly selects the beam (SSB/CSI-RS). In another embodiment, if the PRACH occasion is free for the plurality of beams (SSBs/CSI-RSs) the UE 300 selects the beam (SSB/CSI-RS). with highest strength value.

Further the UE selects the PRACH preamble and the PRACH occasion corresponding to the selected beam (SSB/CSI-RS). The current scenario is applicable when an uplink carrier used for random access is unlicensed.

In another embodiment, the UE 300 checks the channel status of the PRACH occasion corresponding to each transmitted beam (SSB/CSI-RS) and selects the beam (SSB/CSI-RS), if the channel status (based on LBT procedure) of associated PRACH occasion is free. If the channel status is free for multiple beams (SSBs/CSI-RSs) then UE 300 select the beam (SSB/CSI-RS) whose PRACH occasion occurs first in time. If the channel status is free for multiple beams (SSBs/CSI-RSs), the UE 300 may randomly select the beam (SSB/CSI-RS). If the channel status is free for multiple beams (SSBs/CSI-RSs), the UE 300 may select the beam (SSB/CSI-RS) with the highest strength. If the channel status is free for multiple beams (SSBs/CSI-RSs), the UE 300 may select any beam (SSB/CSI-RS) where threshold is configured by gNB in broadcast or dedicated RRC signaling.

Contention Free PRACH:

In an embodiment, if the contention free resources associated with the beams (SSBs/CSI-RSs) are configured and there is at least one beam (SSB/CSI-RS) amongst the associated beams (SSBs/CSI-RSs) for which SS-RSRP (or SS-RSRQ or SS-RSSI) is greater than the threshold, and channel status of PRACH occasion associated with the beam (SSB/CSI-RS) is free then the UE 300 selects the beam (SSB/CSI-RS) among the associated beams (SSBs/CSI-RSs) for which the RSRP (or SS-RSRQ or SS-RSSI) is greater than the threshold and channel status of the associated PRACH occasion is free. If multiple such beams (SSBs/CSI-RSs) are available then the UE 300 selects the beam (SSB/CSI-RS) whose PRACH occasion occurs first in time. If multiple such beams (SSBs/CSI-RSs) are available then the UE 300 selects the beam (SSB/CSI-RS) with highest RSRP (or RSRQ or RSSI). If multiple such beams (SSBs/CSI-RSs) are available, the UE 300 may randomly select the beam (SSB/CSI-RS). After selecting the beam (SSB/CSI-RS), the UE 300 selects the CF RACH resource and preamble corresponding to the selected beam (SSB/CSI-RS).

In another embodiment, if the CF resources associated with the beams (SSBs/CSI-RSs) are not configured or if CF resources are configured but there is no beam (SSB/CSI-RS) amongst the associated beams (SSBs/CSI-RSs) for which SS-RSRP (or SS-RSRQ or SS-RSSI) is greater than the threshold, or if the contention free resources associated with the beams (SSBs/CSI-RSs) are configured and there is at least one beam (SSB/CSI-RS) amongst the associated beams (SSBs/CSI-RSs) for which SS-RSRP (or SS-RSRQ or SS-RSSI) is greater than the threshold, but the channel status of PRACH occasions associated with these beams (SSBs/CSI-RSs) with SS-RSRP (or SS-RSRQ or SS-RSSI) greater than the threshold is not free, then the UE 300 selects a beam (SSB/CSI-RS) from all transmitted SSBs/CSI-RSs wherein for selected SSB/CSI-RS SS-RSRP (or SS-RSRQ or SS-RSSI) is greater than the threshold and channel status of PRACH occasion is free. If there are multiple such beams (SSBs/CSI-RSs) then the UE selects the beam (SSB/CSI-RS) whose PRACH occasion occurs first in time. Alternately, if there are multiple such beams (SSBs/CSI-RSs) then the UE 300 may select the beam (SSB/CSI-RS) randomly. Alternately, if there are multiple such beams (SSBs/CSI-RSs) then the UE 300 select the beam (SSB/CSI-RS) with highest SS-RSRP (or SS-RSRQ or SS-RSSI). The UE 300 then selects CB PRACH resource and preamble corresponding to selected beam (SSB/CSI-RS).

In another embodiment, If CF resources associated with (SSBs/CSI-RSs) are configured and there is at least one SSB/CSI-RS amongst the associated (SSBs/CSI-RSs) for which channel status of associated PRACH occasion is free: Select an SSB/CSI-RS amongst the associated (SSBs/CSI-RSs) for which channel status of associated PRACH occasion is free; if there are multiple such (SSBs/CSI-RSs) the UE select the SSB/CSI-RS whose PRACH occasion occurs first in time or the UE 300 randomly select one, or the UE 300 select the SSB/CSI-RS with best SS/CSIRS-RSRP (or SS/CSIRS-RSRQ or SS/CSIRS-RSSI), UE select any SSB/CSI-RS with SS/CSIRS-RSRP (or SS/CSIRS-RSRQ or SS/CSIRS-RSSI)>threshold where threshold is configured by gNB in broadcast or dedicated RRC signaling, Select CF PRACH resource and preamble (dedicatedly signaled by gNB) corresponding to selected SSB/CSI-RS. Else (i.e. condition "If CF resources associated with (SSBs/CSI-RSs) are configured and there is at least one SSB/CSI-RS amongst the associated (SSBs/CSI-RSs) for which channel status of associated PRACH occasion is free" is not true or not met), Select an SSB/CSI-RS for which channel status of associated PRACH occasion is free; Select CB PRACH resource and preamble corresponding to selected SSB/CSI-RS.

RACH Resource Configuration

In an embodiment the gNB 302 configures the plurality of PRACH resources in frequency domain spread across the whole spectrum (or BWP) in the same time domain PRACH occasion. The configuration for multiple PRACH resources in frequency domain is provided in system information RRC message (for the case of initial access) or is provided dedicatedly to the UE 300 using RRC reconfiguration message. The gNB may provide this configuration in form of one or more PRACH Frequency Bundle. The gNB may configure one or more PRACH Frequency Bundle, where each PRACH Frequency Bundle may contain an associated configuration identity value and set of PRACH resources which is used for PRACH transmission.

In one embodiment, for each PRACH resource, gNB will indicate the frequency identifier (e.g. ARFCN or RB index or bandwidth part information) where PRACH can be transmitted. In another embodiment, gNB will provide number of PRACH resources in the frequency domain, lowest frequency where the PRACH resource is present and an additional parameter indicating frequency separation/gap/offset between successive PRACH resources in frequency domain. The gNB 302 may provide this configuration for each PRACH Frequency Bundle if such configuration exists or can provide this configuration for each cell. In another embodiment, for each PRACH resource, the gNB 302 will indicate the offset from previous PRACH resource in terms of frequency value (e.g. ARFCN or RB or RBG) where PRACH can be transmitted. In another embodiment, the gNB 302 provides a bitmap corresponding all RB's/RBG's to indicate which RB/RBG within a cell can be used for PRACH. The gNB 302 can configure a bitmap for each PRACH Frequency Bundle, if configured.

In another embodiment the gNB may configure multiple PRACH occasions in time domain. The configuration for multiple PRACH occasions in time domain is provided in system information RRC message (for the case of initial access) or can be provided dedicatedly to the UE using RRC reconfiguration message. The gNB may provide configuration of PRACH time repetition bundle. Each PRACH Time Repetition bundle is associated with an identity value and is defined as a set of PRACH resources consisting of multiple PRACH Transmission occasions spread over time domain.

FIG. 5 is a schematic diagram, illustrating a PRACH repetition bundle resource configuration, where each bundle is associated with a set of PRAACH occasion number. As seen in FIG. 5 for each PRACH repetition bundle the gNB will indicate one or more time domain identifiers (e.g. SFN and/or slot index and/or symbol index and/or PRACH occasion index) where PRACH can be transmitted for each PRACH time repetition bundle.

In another embodiment the gNB can provides a bitmap of time domain identifiers (e.g. SFN and/or slot index and/or symbol index or PRACH occasion index) to indicate repetition occasions. In another embodiment, the gNB will provide PRACH repetition bundle size in the time domain (e.g. number of PRACH occasions within one PRACH repetition bundle), PRACH repetition bundle start time offset, and an additional parameter indicating time domain separation/gap/offset between successive repetition occasions in terms of SFN and/or slot index and/or symbol index and/or PRACH transmission occasion.

PRACH Transmission

In an embodiment, the gNB has configured multiple PRACH transmission occasion in frequency domain, and PRACHFreqDomainRepetition (received in SI and configurable via RRC Message/MAC CE/DCI) is not configured, then the UE 300 MAC Layer indicates the time domain PRACH occasion and corresponding multiple frequency domain PRACH resource to PHY layer. The PHY layer performs PRACH transmission on the frequency domain resource for which LBT succeeds. The PHY layer indicates the frequency domain resource used for PRACH transmission/RA-RNTI value to MAC Layer. The MAC layer shall compute RA-RNTI value based on the frequency domain resource used by physical layer for PRACH transmission.

In another embodiment, if the gNB 302 has configured multiple PRACH transmission occasion in frequency domain, and PRACHFreqDomainRepetition (received in SI and configurable via RRC Message/MAC CE/DCI) is configured, the UE 300 MAC Layer indicates the time domain PRACH occasion and corresponding multiple frequency domain PRACH resource to PHY layer.

If the PRACH frequency Bundle is configured to the UE 300, the UE 300 performs one or more RACH repetitions over a single PRACH Frequency Bundle. The UE 300 may skip PRACH transmission within the PRACH Frequency Bundle for occasions in which LBT Fails.

In one embodiment, for RAR monitoring the RA-RNTI is computed as a function of frequency index of the lowest or highest frequency location of the PRACH Frequency Bundle irrespective of whether it was used for PRACH transmission or not. In another embodiment, the RA-RNTI is computed as a function of PRACH Frequency Bundle configuration identity.

In another embodiment if the PRACHFreqDomainRepetition is configured to UE, then the PRACH transmission is done on multiple frequency domain resources for which LBT succeeds. Number of PRACH transmissions should not exceed PRACHFreqDomainRepetition. The UE 300 indicates the frequency domain resources used for PRACH transmission/RA-RNTI value to MAC Layer. The MAC layer also computes RA-RNTI values based on the frequency domain resources used by physical layer for PRACH transmission. The UE 300 monitors RARs corresponding to each RA-RNTI value computed.

In another embodiment, if gNB has configured multiple PRACH transmission occasions in time domain and PRACHTimeDomainRepetition (received in SI and configurable via RRC Message/MAC CE/DCI) and PRACH repetition bundle is not configured, UE MAC Layer will indicate the time domain PRACH occasions and corresponding frequency domain PRACH resource. The PHY layer performs PRACH transmission on the Time domain resource for which LBT succeeds. The UE 300 indicates the Time domain resource used for PRACH transmission/RA-RNTI value to MAC Layer. The MAC layer computes RA-RNTI value based on the time domain resource used by physical layer for PRACH transmission.

In another embodiment, If gNB has configured multiple PRACH transmission occasion in Time domain, and PRACHTimeDomainRepetition (received in SI and configurable via RRC Message/MAC CE/DCI) or PRACH repetition bundle is configured, then UE 300 MAC Layer indicates the multiple time domain PRACH occasions and corresponding frequency domain PRACH resource. If PRACH repetition bundle is configured to UE 300, then the UE 300 performs one or more PRACH repetitions over a single repetition bundle. The UE 300 may skip PRACH transmission within the PRACH repetition bundle for occasions in which LBT Fails. The UE 300 may start PRACH transmission on any of the PRACH occasions within a repetition bundle using the RA-RNTI corresponding to the bundle. The gNB 302 may provide pre-defined/configurable start positions within a repetition bundle for first PRACH transmission.

For RAR monitoring, the RA-RNTI is computed as a function of time index (symbol number, slot number, frame number) of the first transmission opportunity of the repetition bundle irrespective of whether it was used for PRACH transmission or not. In another embodiment the RA-RNTI is computed as a function of PRACH repetition bundle configuration identity.

In another embodiment if the PRACHTimeDomainRepetition is configured to UE (300), the UE (300) performs the PRACH transmission on multiple Time domain resources for which LBT succeeds. Number of PRACH transmissions should not exceed PRACHTimeDomainRepetition. The UE 300 indicates the Time domain resources used for PRACH transmission/RA-RNTI value for each PRACH transmission to MAC Layer. The MAC layer computes RA-RNTI values based on the time domain resources used by physical layer for PRACH transmission. The UE 300 tries to monitor RARs corresponding to each RA-RNTI value(s) computed.

RAR Monitoring

In an embodiment when for the case when multiple PRACH Transmission are done (not repetition) then UE 300 may have multiple RA-RNTI's for which RAR can be received. UE 300 may monitor PDCCH for RAR's corresponding to multiple RA-RNTI. The RAR is defined to be successfully received if a Random Access Response is received by UE 300 and is identified by a RA-RNTI (corresponding to multiple PRACH transmissions) maintained by the UE 300 and the corresponding RAR contains a RAPID which is same as the RAPID value associated with the RACH transmission for which the given RA-RNTI is determined. In an embodiment, the RAR is defined to be successfully received if C-RNTI for which a downlink assignment has been received on the PDCCH of SpCell and the received TB is successfully decoded.

In one embodiment, UE 300 may start/restart the ra-ResponseWindow as per the configuration at the first PDCCH occasion from the end of Random Access Preamble transmission for every Random Access Preamble transmission and (or) repetition.

In another embodiment, UE will monitor RAR until RAR_RecvMax (received in SI and configurable via RRC Message/MAC CE/DCI) successful RAR's are received or RAR_MONITORING_STOP (described later) event is triggered or if the Random Access Response includes a MAC subPDU with RAPID only.

In another embodiment, for the purpose of message3 transmission, UE shall store grant(s) and TC-RNTI corresponding to each successfully received RAR irrespective of whether RachMultipleTcrntiAllowed is configured or not.

In another embodiment, UE can stop ra-ResponseWindow, when RAR_RecvMax (received in SI and configurable via RRC Message/MAC CE/DCI) successful RAR's are received or RAR_MONITORING_STOP (described later) event is triggered by MAC Layer or if the Random Access Response includes a MAC subPDU with RAPID only.

In another embodiment, if multiple Backoff Indicators are received corresponding to current Random Access attempt, the UE 300 sets PREAMBLE_BACKOFF to the maximum value among the Backoff Indicators received. The UE 300 may set the PREAMBLE_BACKOFF to a minimum value among the Backoff Indicators received. The UE 300 may set the PREAMBLE_BACKOFF to average/median/mode value of the Backoff Indicators received. The UE 300 may set the PREAMBLE_BACKOFF to first Backoff Indicators received. The UE 300 may set the PREAMBLE_BACKOFF to last Backoff Indicators received.

In another embodiment, if multiple Timing Advance (TA) are received corresponding to current Random Access attempt, the UE 300 sets TA value to the maximum value among the Timing Advance received. The UE 300 may set the TA value to a minimum value among the Timing Advance received. The UE 300 may set the TA value to an average/mode/median value of the Timing Advance received. The UE 300 may set the TA value when a first Timing Advance is received. The UE 300 may set the TA value when a last Timing Advance received.

RAR Failure

In one embodiment, the UE 300 declares a RAR Failure only if no successful RAR is received at ra-ResponseWindow expiry and increments PREAMBLE_TRANSMISSION_COUNTER corresponding to every preamble sent in the current Random Access attempt by one.

In another embodiment, the UE 300 declares a RAR Failure if less than RAR_RecvMin (received in SI and configurable via RRC Message/MAC CE/DCI) successful RAR's are received, on ra-ResponseWindow expiry.

Multiple Message3 Grant in RAR

In 4 step random access procedure, UE transmits random access preamble in a RACH occasion. Upon transmitting the random access preamble UE monitors RAR window for random access response (RAR). In the RAR window UE monitors PDCCH addressed to RA-RNTI where the PDCCH addressed to RA-RNTI schedules a downlink transport block and this downlink transport block carries RAR MAC PDU. The RA-RNTI is derived based on the PRACH occasion in which UE has transmitted random access preamble. Size of RAR window is configured by gnB. In the RAR MAC PDU UE checks for RAR corresponding to its transmitted random access preamble. If RAR MAC PDU includes RAR corresponding to its transmitted random access preamble, UE processes the received RAR. In an embodiment, the received RAR may contain multiple UL grants for Message3 Transmission that is each RAR may indicate multiple opportunities for message3 transmission in terms of multiple time-frequency resource allocations for the purpose of message3 transmissions (or repetition) in contrast to existing RAR which contains a single time-frequency allocation for the purpose of purpose of message3 transmission, termed as single UL grant. FIG. 8 is a sequence diagram illustrating reception of multiple UL grants in the RAR received by the UE 300. Upon receiving multiple UL grants in RAR, UE 300 perform LBT for allocated UL grants. UE transmits Msg3 in UL grant for which LBT is successful. Even though multiple UL grants are allocated to UE, in an embodiment UE transmits Msg3 in only one UL grant.

In another embodiment, RAR contains a single UL grant but the UL grant contains repetition resources which can be valid for multiple slots/symbols (or PUSCH durations).

In an embodiment, the gNB 302 provides a Bitmap of length L which is indicated within RAR or is configured using RRC configuration (e.g. system information or dedicated RRC configuration) associated to the RACH resource configuration. Each bit in the bitmap corresponds to a slot/symbol and if the bit is enabled, it indicates that the UE 300 may use the given slot/symbol for Msg-3 transmission. Msb (or bit 0) in the bitmap corresponds to the x+yth slot where x is the slot in which RAR is received, y is pre-defined or configured by the network, bit N corresponds to the (slot/symbol indicated by MSB+N)th slot/symbol.

In another embodiment, the gNB 302 also provide absolute number of consecutive slots/symbols starting from x+yth slot where Msg-3 can be transmitted. Here, x is the slot in which RAR is received, y is pre-defined. This information is provided in RAR or is configured using RRC configuration (e.g. system information or dedicated RRC configuration) associated to a RACH resource configuration and a 5G cell or frequency.

In another embodiment, RAR includes num_PUSCH durations. It also indicates where the each PUSCH duration start and length of PUSCH duration. RAR includes num_PUSCH durations. It also includes an offset X and length of PUSCH duration. The first PUSCH duration is at on offset X from the slot in which RAR is received. The subsequent PUSCH duration are at an offset X from previous PUSCH duration.

In an embodiment, the RAR contains a single grant but grant but the grant contains multiple repetition resources in frequency domain spread across the whole spectrum (or BWP). In an embodiment, for each resource, the NB indicates the frequency identifier (e.g. ARFCN or RB index) where Msg3 can be transmitted. In another embodiment, the NB provides number of resources in the frequency domain and an additional parameter indicating frequency separation/gap/offset between successive resources in frequency domain where msg3 can be transmitted. In another embodiment, for each resource, the NB indicates the offset from previous resource in terms of frequency identifier (e.g. ARFCN or RB index) where msg3 can be transmitted. In another embodiment, NB can provide a bitmap corresponding all RB's/RBG's to indicate which RB/RBG can be used for msg3 transmission.

In another embodiment, the RAR contains a single grant and a periodicity in terms of one or more time domain identifier (SFN and/or slot index and/or symbol index etc.) and (or) one or more frequency domain identifier (e.g. ARFCN or RB index or RBG' or BWPs etc.) to indicate time-frequency resources which can be used by the UE to perform message3 transmission. In here the UE 300 start maxMsg3Grant Validity Timer when RAR is received. The UE 300 considers the grant valid till contention resolution is successful or a maxMsg3Grant Validity Timer is running. The UE 300 stops maxMsg3Grant Validity Timer when contention resolution success. The UE 300 also stops using the time-frequency resources indicated by the grant and discard it after maxMsg3GrantValidityTimer expiry. The maxMsg3GrantValidityTimer is received in RAR or have a static configuration or be configurable/re-configurable via broadcast signaling and (or) RRC messaging and (or) using DCI and (or) using MAC CE.

FIG. 6 is a schematic diagram, illustrating grants received in the RAR with a periodicity of 4 SFN. As seen in FIG. 6 the grant is received for every fourth SFN number.

FIG. 7 is a sequence diagram illustrating the embodiment in which a RAR includes only one UL grant but the gNB can send multiple RARs to the UE 300 to allocate multiple UL grants. In this embodiment, upon receiving the first RAR corresponding to its transmitted random access preamble, UE continues to monitor PDCCH addressed to RA-RNTI in RAR window for additional RARs. In the embodiment of FIG. 8, upon receiving the first RAR corresponding to its transmitted random access preamble, UE stops to monitor PDCCH addressed to RA-RNTI in RAR window.

Message3 Transmission and Contention Resolution

In an embodiment due to Multiple RAR reception and/or multiple grants in message3, the UE 300 have multiple valid Message3 transmission occasion. The UE 300 performs one msg3transmission corresponding to the first grant for which LBT succeeds and triggers RAR_MONITORING_STOP on successful transmission of message3. The UE 300 trigger RAR_MONITORING_STOP on contention resolution success.

In another embodiment, along with PDCCH monitoring for RAR's, the UE 300 perform message3 transmission using the grant provided in successfully received RAR and performs one of the following: for the purpose of message3 transmission, the UE 300 sets the TC-RNTI corresponding to the RAR which contained the grant for current message3 transmission (If NB configures RachMultipleTcrntiAllowed via broadcast and (or) pre-configured and (or) via MAC CE and (or) via RRC signaling and (or) via DCI). For the purpose of message3 transmission, the UE 300 set TC-RNTI corresponding to the first successfully received RAR and use it for all further message3 transmission attempts (If NB does not configure RachMultipleTcrntiAllowed).

In another embodiment, the UE 300 performs multiple msg3 transmissions and (or) repetitions. The NB can configure/re-configure RachMsg3Count, RachMsg3Repetition, RachMsg3Offset (time domain identifier e.g. SFN and/or slot index and/or symbol index), via broadcast and (or) pre-configured and (or) via MAC CE and (or) via RRC signaling and (or) via DCI. The UE 300 define message3 repetition as multiple transmission of same message3 i.e message3 associated to same TC-RNTI. If the NB does not configure RachMsg3Repetition, UE 300 does not perform any message3 repetitions. If the NB configures RachMsg3Repetition, UE 300 performs at most RachMsg3Repetition repetitions if sufficient grants are available for message3 transmission and LBT succeeds on multiple grants using TC-RNTI selected. If the NB does not configure RachMsg3Count UE 300 uses only one TC-RNTI selected for message3 transmissions using grants for which LBT succeeds. If the NB configures RachMsg3Count UE 300 use at most RachMsg3Count number of TC-RNTI's selected for message3 transmissions using grants for which LBT succeeds. If RachMsg3Offset is configured, the UE 300 perform consecutive msg3 transmission and (or) repetition separated by at least RachMsg3Offset in time domain.

In another embodiment, the UE 300 starts monitoring for message4 and start ra-ContentionResolutionTimer: After first successful message3 transmission, after all message3 transmissions/Repetitions have been done.

In another embodiment, the UE 300 restarts ra-ContentionResolutionTimer on subsequent message3 transmission and (or) repetition. In another embodiment, if multiple msg3 transmission were done using multiple TC-RNTI, the UE 300 monitors PDCCH to downlink assignment addressed to multiple TC-RNTI's or C-RNTI.

In another embodiment, if the CCCH SDU is included in Msg3 and the PDCCH transmission is addressed to one of its TEMPORARY_C-RNTI's and if the MAC PDU is successfully decoded, and if RachMsg3Repetition and RachMsg3Count are not configured by the gNB 302 and if multiple message3 transmissions/repetitions are done then the UE 300 stops ra-ContentionResolutionTimer and stop monitoring PDCCH for downlink assignment addressed to TC-RNTI's and (or) C-RNTI and consider Contention Resolution unsuccessful, else the UE 100 continue monitoring PDCCH for downlink assignment addressed to TC-RNTI's and (or) C-RNTI.

In another embodiment, if the CCCH SDU is included in Msg3 and the PDCCH transmission is addressed to one of its TEMPORARY_C-RNTI's and if the MAC PDU is not successfully decoded, and if RachMsg3Repetition and RachMsg3Count are not configured by NB and if multiple message3 transmissions/repetitions are done, the UE 300 stop ra-ContentionResolutionTimer and stop monitoring PDCCH for downlink assignment addressed to TC-RNTI's and (or) C-RNTI and consider Contention Resolution unsuccessful, else the UE 300 continue monitoring PDCCH for downlink assignment addressed to TC-RNTI's and (or) C-RNTI In another embodiment, If multiple message3 transmissions/repetitions are done and if the CCCH SDU is included in Msg3 and the PDCCH transmission is addressed to one of its TEMPORARY_C-RNTI's and if the MAC PDU is successfully decoded and if the MAC PDU contains a UE Contention Resolution Identity MAC CE and if the UE Contention Resolution Identity in the MAC CE matches the CCCH SDU transmitted in Msg3 and if and this Random Access procedure was not initiated for SI request then the UE 300 stops ra-ContentionResolutionTimer, sets C-RNTI equal to corresponding TC-RNTI, stops monitoring PDCCH for downlink assignment addressed to its TC-RNTI's and consider Contention Resolution successful. Otherwise if RachMsg3Repetition and RachMsg3Count are not configured by NB and if multiple message3 transmissions/repetitions are done, the UE 100 stops ra-ContentionResolutionTimer and stops monitoring PDCCH for downlink assignment addressed to TC-RNTI's and (or) C-RNTI and consider Contention Resolution unsuccessful, else the UE 300 continue monitoring PDCCH for downlink assignment addressed to TC-RNTI's and (or) C-RNTI and stops ra-ContentionResolutionTimer if Contention Resolution is successful.

In an embodiment, upon receiving one or more UL grants for Msg3 transmission in random access response(s) corresponding to its transmitted random access preamble, UE 300 perform LBT for allocated UL grant(s). UE transmits Msg3 in UL grant for which LBT is successful. Even though multiple UL grants may be allocated to UE, UE transmits Msg3 in only one UL grant for which LBT is successful. If UE is not able to transmit message3 in UL grant(s) received in random access response, UE shall not start the contention resolution timer and UE will go back to step of performing the random access preamble transmission (i.e. UE will again select SSB/CSIRS, preamble and RACH occasion and transmit random access preamble). If UE is able to transmit message3 in UL grant received in random access response, contention resolution timer is started. This is unlike the current system wherein contention resolution timer is always started from the end of UL grant allocation. In this case before going back to step of performing the random access preamble transmission UE shall not perform random access backoff. This is unlike the current system wherein UE always perform back off before going back to step of performing the random access preamble transmission. If UE is able to transmit message3 in UL grant received in random access response, contention resolution timer is started.

PRACH Transmission Failure

In an embodiment, the gNB 302 configure PRACH_TxTimer (received in SI and configurable via RRC Message/MAC CE/DCI). THE UE 300MAC Layer starts PRACH_TxTimer when it instructs PHY Layer for PRACH Transmission and PRACH_TxTimer is not running already. The UE 300 MAC Layer stops PRACH_TxTimer on successful PRACH transmission/RA-RNTI used/RACH resource used indication from PHY layer. The UE 300 MAC Layer declares RACH Failure due to LBT on PRACH_TxTimer Expiry, and report the event to RRC. RRC in UE may declare RLF or may trigger cell reselection to a cell on another carrier/frequency.

In another embodiment, the gNB 302 configures PRACH_TxFailCountMax (received in SI and configurable via RRC Message/MAC CE/DCI). The UE 300 MAC Layer initializes PRACH_TxFailCount=0 when it is in idle state. The UE 300 MAC Layer increments PRACH_TxFailCount by 1 whenever PRACH transmission attempt fails due to LBT failure. The UE 300 MAC Layer resets PRACH_TxFailCount=0 when a successful PRACH transmission is done. The UE 300 MAC Layer declare RACH Failure due to LBT if PRACH_TxFailCount>=PRACH_TxFailCountMax, and report the event to RRC. RRC in UE may declare RLF or may trigger cell reselection to a cell on another carrier/frequency.

FIG. 10 is a schematic diagram, illustrating availability of occasion for proposed method, according to an embodiment as disclosed herein. As seen in FIG. 10 the available PRACH transmission occasion is more in the proposed method than the available PRACH transmission occasion in the conventional method as shown in FIG. 9.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for performing random access channel procedure by a User Equipment (UE) (300) for unlicensed operation in a wireless network, the method comprising:
   determining, by the UE (300), a first measurement metric and a second measurement metric for one of a plurality of SSBs (Synchronization Signal Block) and a plurality of CSI-RSs (Channel State Information-Reference Signal), wherein the first measurement metric is a channel congestion;
selecting, by the UE (300), one of a first set of SSBs and a first set of CSI-RSs from one of the plurality of SSBs and the plurality of CSI-RSs based on the first measurement metric, wherein the first set of SSBs is a subset of the plurality of SSBs, and the first set of CSI-RSs is a subset of the plurality of CSI-RSs;
selecting, by the UE (300), one of a second set of SSBs and a second set of CSI-RSs from one of the first set of SSBs and the first set of CSI-RSs based on the second measurement metric, wherein the second set of SSBs is a subset of the first set of SSBs, and the second set of CSI-RSs is a subset of the first set of CSI-RSs;
determining, by the UE (300), selection criteria based on a best value of the first measurement metric; and
selecting, by the UE (300), one of at least one candidate SSB and at least one candidate CSI-RS from one of the second set of SSBs and the second set of CSI-RSs based on the selection criteria.

2. The method as claimed in claim 1, wherein selecting, by the UE (300), one of the first set of SSBs and the first set of CSI-RSs from one of the plurality of SSBs and plurality of CSI-RSs based on the first measurement metric comprises:
comparing a value of the first measurement metric of one of the plurality of SSBs and the plurality of CSI-RSs to a first measurement metric threshold; and
selecting one of the first set of SSBs and the first set of CSI-RSs from one of the plurality of SSBs and plurality of CSI-RSs that meets the first measurement metric threshold based on the comparison.

3. The method as claimed in claim 1, wherein selecting, by the UE (300), one of the second set of SSBs and the second set of CSI-RSs from one of the first set of SSBs and the first set of CSI-RSs based on the second measurement metric comprises:
comparing a value of the second measurement metric of one the first set of SSBs and the first set of CSI-RSs to a second measurement metric threshold; and
selecting one of the second set of SSBs and the second set of CSI-RSs from one of the first set of SSBs and the first set of CSI-RSs having second measurement metric greater than the second measurement metric threshold based on the comparison.

4. The method as claimed in claim 1, wherein the selection criteria is determined based on a random access channel (RACH) occasion, and a best value of the second measurement metric, and
wherein the second measurement metric is a Reference Signal Resource Power (RSRP).

5. The method as claimed in claim 1, further comprising:
selecting, by the UE, a PRACH preamble and a PRACH occasion based on one of the at least one candidate SSBs and the at least one candidate CSI-RS;
selecting, by the UE, a PRACH resource for PRACH preamble transmission;
configuring, by the UE, the PRACH resource based on the PRACH occasion and the PRACH preamble; and
transmitting, by the UE, the PRACH preamble using the configured PRACH resource.

6. The method as claimed in claim 5, further comprising:
receiving, by the UE, a Random Access Response (RAR) in response to the PRACH preamble, wherein the RAR comprises a plurality of uplink (UL) grants (UL); and
transmitting, by the UE, uplink transmissions in the UL grants received in RAR based on a channel status,
wherein the UE (300) performs an uplink transmission if the channel status based on Listen Before Talk (LBT) is free for a corresponding UL grant.

7. The method as claimed in claim 5, further comprising:
receiving, by the UE (300), one or more RARs in response to the PRACH preamble, wherein a RAR comprises an uplink grant; and
transmitting, by the UE (300), an uplink transmission in a UL grant received in one of the RARs based on a channel status.

8. A UE (300) in a wireless network for performing random access channel procedure for unlicensed operation, the UE (300) comprising:
a memory (310);
a processor (320); and
a communicator (330),
wherein the processor (320) is configured to:
determine a first measurement metric and a second measurement metric for one of a plurality of SSBs (Synchronization Signal Block) and a plurality of CSI-RSs (Channel State Information-Reference Signal), wherein the first measurement metric is a channel congestion,
select one of a first set of SSBs and a first set of CSI-RSs from one of the plurality of SSBs and the plurality of CSI-RSs based on the first measurement metric, wherein the first set of SSBs is a subset of the plurality of SSBs, and the first set of CSI-RSs is a subset of the plurality of CSI-RSs,
select one of a second set of SSBs and a second set of CSI-RSs from one of the first set of SSBs and the first set of CSI-RSs based on the second measurement metric, wherein the second set of SSBs is a subset of the first set of SSBs, and the second set of CSI-RSs is a subset of the first set of CSI-RSs,
determine selection criteria based on a best value of the first measurement metric, and
select one of at least one candidate SSBs and at least one candidate CSI-RS from one of the second set of SSBs and the second set of CSI-RSs based on the selection criteria.

9. The UE (300) as claimed in claim 8, wherein to select one of the first set of SSBs and the first set of CSI-RSs from one of the plurality of SSBs and plurality of CSI-RSs based on the first measurement metric the processor is further configured to:
compare a value of the first measurement metric of one of the plurality of SSBs and the plurality of CSI-RSs to a first measurement metric threshold; and
select one of the first set of SSBs and the first set of CSI-RSs from one of the plurality of SSBs and plurality of CSI-RSs that meets the first measurement metric threshold based on the comparison.

10. The UE (300) as claimed in claim 8, wherein to select one of the second set of SSBs and the second set of CSI-RSs from one of the first set of SSBs and the first set of CSI-RSs based on the second measurement metric the processor is further configured to:
compare a value of the second measurement metric of one the first set of SSBs and the first set of CSI-RSs to a second measurement metric threshold; and
select one of the second set of SSBs and the second set of CSI-RSs from one of the first set of SSBs and the first set of CSI-RSs having second measurement metric greater than the second measurement metric threshold based on the comparison.

11. The UE (300) as claimed in claim 8, wherein the selection criteria is determined based on a random access channel (RACH) occasion, and a best value of the second measurement metric.

12. The UE (300) as claimed in claim 8, wherein the second measurement metric is a Reference Signal Resource Power (RSRP).

13. The UE (300) as claimed in claim 8, wherein the processor (320) is further configured to:
   select a PRACH preamble and a PRACH occasion based on one of the at least one candidate SSBs and the at least one candidate CSI-RS;
   select a PRACH resource for PRACH preamble transmission; and
   configure the PRACH resource based on the PRACH occasion and the PRACH preamble; and
   transmit the PRACH preamble using the configured PRACH resource.

14. The UE (300) as claimed in claim 13, wherein the processor (320) is further configured to:
   receive a Random Access Response (RAR) in response to the PRACH preamble, wherein the RAR comprises a plurality of uplink (UL) grants (UL); and
   transmit uplink transmissions in the UL grants received in the RAR based on a channel status,
   wherein the UE (300) performs an uplink transmission if the channel status based on Listen Before Talk (LBT) is free for a corresponding UL grant.

15. The UE (300) as claimed in claim 13, wherein the processor (320) is further configured to:
   receive one or more RARs in response to the PRACH preamble, wherein a RAR comprises an uplink (UL) grant; and
   transmit an uplink transmission in a UL grant received in one of the RARs based on a channel status, and
   wherein the UE (300) performs the uplink transmission if the channel status based on Listen Before Talk (LBT) is free for the UL grant.

\* \* \* \* \*